United States Patent
Schmidt et al.

(10) Patent No.: US 10,104,147 B2
(45) Date of Patent: Oct. 16, 2018

(54) METHOD FOR WIRELESSLY TRANSMITTING AUDIO SIGNALS ON THE BASIS OF THE BLUETOOTH STANDARD AND WIRELESS MICROPHONE UNIT

(71) Applicant: Sennheiser electronic GmbH & Co. KG, Wedemark (DE)

(72) Inventors: Axel Schmidt, Wedemark (DE); Konstantin Septinus, Peine (DE); Norbert Werner, Hannover (DE); Claus Menke, Schneverdingen (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 17 days.

(21) Appl. No.: 15/523,434

(22) PCT Filed: Dec. 1, 2015

(86) PCT No.: PCT/EP2015/078175
§ 371 (c)(1),
(2) Date: May 1, 2017

(87) PCT Pub. No.: WO2016/087245
PCT Pub. Date: Jun. 9, 2016

(65) Prior Publication Data
US 2017/0318069 A1    Nov. 2, 2017

(30) Foreign Application Priority Data
Dec. 4, 2014 (DE) .......................... 10 2014 224 883

(51) Int. Cl.
*H04L 29/06* (2006.01)
*H04L 1/08* (2006.01)
(Continued)

(52) U.S. Cl.
CPC .............. *H04L 65/607* (2013.01); *H04L 1/08* (2013.01); *H04L 1/1657* (2013.01); *H04L 1/203* (2013.01);
(Continued)

(58) Field of Classification Search
CPC . H04L 1/08; H04L 1/203; H04L 1/657; H04L 65/607; H04L 69/329
See application file for complete search history.

(56) References Cited

U.S. PATENT DOCUMENTS

| | | |
|---|---|---|
| 2005/0037708 A1 | 2/2005 | Torvinen |
| 2007/0011335 A1* | 1/2007 | Burns .................. H04W 76/10 709/227 |

(Continued)

FOREIGN PATENT DOCUMENTS

| | | |
|---|---|---|
| CN | 101841552 | 9/2010 |
| GB | 2 373 412 | 9/2002 |

OTHER PUBLICATIONS

Ni et al., Design of micro mobility support in Bluetooth sensor network, IEEE, pp. 150-154 (Year: 2006).*

(Continued)

*Primary Examiner* — Shelly A Chase
(74) *Attorney, Agent, or Firm* — Haug Partners LLP

(57) ABSTRACT

A method for wirelessly transmitting audio signals based on the Bluetooth protocol from a Bluetooth audio source to a computer device (audio sink). An audio signal is converted in the Bluetooth audio source into an audio data packet. The audio data packets are converted into L2CAP data packets in the Bluetooth audio source based on a protocol with access to the L2CAP layer, and wirelessly transmitted. The Bluetooth audio source suppresses renewed transmission of L2CAP data packets which were erroneous or which were not received by the sink. Real-time transmission or repro- (Continued)

duction of the audio stream or the audio signal can thus be effected. The audio stream or an audio signal on the L2CAP layer may be transmitted with a reduced repetition rate in respect of erroneous data packets. Access to RFCOMM or another data transport protocol with access to the L2CAP layer can be provided from the application layer.

8 Claims, 1 Drawing Sheet

(51) Int. Cl.
    *H04L 1/16*      (2006.01)
    *H04L 1/20*      (2006.01)
    *H04L 29/08*     (2006.01)
    *H04W 4/80*     (2018.01)

(52) U.S. Cl.
    CPC ........ *H04L 65/4069* (2013.01); *H04L 65/602* (2013.01); *H04L 65/608* (2013.01); *H04L 65/80* (2013.01); *H04L 69/08* (2013.01); *H04L 69/329* (2013.01); *H04W 4/80* (2018.02)

(56) References Cited

U.S. PATENT DOCUMENTS

2010/0273417 A1* 10/2010 Tian .................... H04M 1/6066
                                                                                          455/41.2
2013/0089080 A1     4/2013 Singer

OTHER PUBLICATIONS

Hua et al., Analysis of the packet transferring in L2CAP layer of Bluetooth v2.x_EDR, IEEE< pp. 753 to 758 (Year: 2008).*
International Search Report for Application No. PCT/EP2015/078175 dated Feb. 5, 2016.
Nieminen J et al: "Transmission of IPv6 Packets over Bluetooth Low Energy; draft-ietf-6lo-btle-00.txt", Transmission of IPV6 Packets Over Bluetooth Low Energy; Draft-IETF-6LO-BTLE-00. Txt, Internet Engineering Task Force, IETF; Standardworkingdraft, Internet Society (ISOC) 4, Rue Des Falaises CH—1205 Geneva, Switzerland, Nov. 7, 2013 (Nov. 7, 2013), pp. 1-16, XP015096060.

* cited by examiner

METHOD FOR WIRELESSLY TRANSMITTING AUDIO SIGNALS ON THE BASIS OF THE BLUETOOTH STANDARD AND WIRELESS MICROPHONE UNIT

The present application claims priority from International Patent Application No. PCT/EP2015/078185 filed on Dec. 1, 2015, which claims priority from German Patent Application No. 10 2014 224 883.1 filed on Dec. 4, 2014, the disclosures of which are incorporated herein by reference in their entirety.

FIELD OF THE INVENTION

It is noted that citation or identification of any document in this application is not an admission that such document is available as prior art to the present invention.

The present invention concerns a method for wirelessly transmitting audio signals based on a Bluetooth standard and a wireless microphone unit.

The Bluetooth protocol corresponds to the IEEE802.15.1 standard for the wireless transmission of data between devices over a short distance. The Bluetooth protocol has the option of dedicated audio streaming based on an advanced audio distribution profile A2DP. Streaming of audio contents based on A2DP represents a specific application of the Bluetooth standard and is adapted to the requirements of audio streaming. In that respect audio data are transmitted from an initiator like for example a smartphone to an acceptor, for example a wireless loudspeaker. The possible option of receiving audio contents from any initiator via Bluetooth is not provided in accordance with A2DP on conventional computer devices (smart device, tablet, PC and so forth). FIG. 1 shows a diagrammatic representation of the protocol layers of the Bluetooth standard. Therefore FIG. 1 shows the protocol layers of the initiator or audio source 101 and the protocol layers of the acceptor or audio sink 201. The initiator 101 thus has a baseband layer, a logical link control and adaptation protocol L2CAP, and a link manager protocol LMP. One layer higher is the audio/video distribution transport protocol AVDTP, a service discovery protocol SDP and a radio frequency communication protocol RFCOMM. The corresponding situation applies to the acceptor 201. The audio/video distribution transport protocol AVDTP is provided for audio streaming applications. The link manager protocol LMP serves for link establishment and link control. The service discovery protocol SDP serves for displaying what Bluetooth services are supported in a device and how a connection to same can be formed. The radio frequency communication protocol RFCOMM serves as a transport protocol for a reliable and connection-oriented data connection. The uppermost layer of the protocol layers respectively represents the application layer of an audio source as initiator 101 or an audio sink as acceptor 201. In general the advanced audio distribution profile A2DP is used for audio streaming applications. In that case predefined audio codecs or manufacturers of specific codecs can be used. The audio/video distribution transport protocol AVDTP permits a point-to-point connection but not a multicast connection.

On the German patent application from which priority is claimed the German Patent and Trade Mark Office searched the following documents: US 2013/0089080 A1; US 2005/0037708A1 and CN 101841552 A.

SUMMARY OF THE INVENTION

Therefore an object of the present invention is to provide a method for the wireless transmission of audio signals, which permits real-time transmission of audio signals with a dedicated latency and high audio quality, in particular if no established profile for same is provided on the acceptor (audio sink).

Thus there is provided a method for wirelessly transmitting audio signals based on the Bluetooth protocol from a Bluetooth audio source to a computer device (audio sink). An audio signal is converted in the Bluetooth audio source into an audio data packet. The audio data packets are converted into L2CAP data packets in the Bluetooth audio source based on a protocol with access to the L2CAP layer, for example the radio frequency communication protocol (RFCOMM), and wirelessly transmitted. The Bluetooth audio source suppresses renewed transmission of L2CAP data packets which were erroneous or which were not received by the sink or reduces the renewed transmission to a predetermined degree limited by the maximum permissible latency. Real-time transmission or reproduction of the audio stream or the audio signal can thus be effected. In addition the invention provides for transmission of an audio stream or an audio signal on the L2CAP layer with a reduced repetition rate in respect of erroneous data packets. The method according to the invention provides that access to RFCOMM or another data transport protocol with access to the L2CAP layer can be provided from the application layer.

According to an aspect of the present invention coding of the audio signals in the Bluetooth audio source and decoding of the transmitted audio signals in the Bluetooth audio sink is effected in each case in the application layer. This therefore affords a system in which parameters and quality of the audio transmission can be subsequently altered by modification of the application layer or software updates on the computer device.

According to a further aspect of the present invention implementation of audio decoding of the audio data received for example by way of the radio frequency communication protocol is effected in the Bluetooth audio sink. In addition error concealment can be effected in the received audio data in the Bluetooth audio sink. In addition adaptation of the sample rate of the audio data can be effected if the sample rate of the sink differs from the sample rate of the source.

The invention also concerns a wireless microphone unit having a wireless transmitter for the wireless transmission of audio signals based on the Bluetooth protocol. An audio signal is converted into audio data packets and the audio data packets are converted into L2CAP data packets. The wireless transmitter uses a suitable protocol based on L2CAP, that is to say a protocol with access to the L2CAP layer, for example the radio frequency communication protocol RFCOMM. The wireless transmitter prevents renewed transmission of L2CAP data packets which are erroneous or not received by the sink or limits renewed transmission to a predetermined degree which is limited or determined by the maximum permissible latency.

The invention concerns the concept not of streaming audio signals by way of the already present specific audio transmission protocols of the Bluetooth standard, but rather transmitting audio signals in real-time in the form of data between a Bluetooth audio source and a computer device having Bluetooth functionality. As the Bluetooth standard permits a bidirectional exchange of data between two Bluetooth devices a mobile device like for example a smartphone or the like which otherwise functions as an audio source can be used according to the invention as a Bluetooth audio sink which for example can receive audio signals from a Bluetooth audio source like for example a wireless microphone, as data signals.

The invention concerns a notion of providing for example a wireless microphone, by way of a Bluetooth protocol, with a mobile unit or a computer device without altering the Bluetooth protocol at the level of the operating software. In that case the wireless microphone can wirelessly transmit audio signals by way of the Bluetooth standard to the receiver (smart device, tablet, PC and so forth). Thus the wireless microphone serves as a streaming initiator and the computer device, smart device, tablet and so forth serves as the streaming acceptor.

According to the invention wireless transmission of audio signals is to be effected for example from a wireless microphone to a mobile computing device without in that case involving intervention in the operating software of the device. According to the invention the wireless transmission of the audio signals is not effected on one of the specific audio protocols provided by the Bluetooth protocol like for example the advanced audio signal distribution protocol A2DP, but the audio signals are transmitted by way of a data connection. According to the invention therefore provided on the part of the audio source is a proprietary protocol by way of the logical link control and adaptation protocol L2CAP in order to avoid renewed transmission of data packets because of missing transmissions. In addition the audio signals to be transmitted are combined together in data packets and same are received by a Bluetooth receiver as data packets. The received data packets can be extracted or converted into audio signals again in the application layer. According to the invention L2CAP packets which are not received or which are erroneously received cannot lead to the connection breaking off.

According to the invention the Bluetooth audio source can optionally have an audio encoder for encoding or for data compression of the audio signals and the Bluetooth audio sink can optionally have an audio decoder for decoding the audio data. The Bluetooth audio sink further has an error concealment means (concealment of erroneous or unreceived audio data) to avoid audible skipping of the audio signal. The system also has a sample rate converter which compensates for differences in the cycle rates of the audio source and the audio sink. In addition the sample rate converter can provide for an output of the audio data at a different sample rate than the sample rate of the audio source. If the audio data in the audio sink is not directly output but only stored then the sample rate converter can be dispensed with.

According to the invention the audio signals combined in data packets are transmitted by way of an L2CAP-based protocol, for example the RFCOMM protocol. That has the advantage that such a protocol for data transmission is supported by almost all Bluetooth-capable computer devices. In addition adaptations and optimization of the audio encoding can be flexibly involved as audio decoding is effected on the computer device (audio sink) according to the invention completely within the application layer.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

According to the invention there is provided a wireless transmission of at least one audio stream based on the Bluetooth protocol from a streaming initiator to a streaming acceptor. The wireless transmission of audio streams according to the invention is effected in real time, that is to say the audio stream generated in the audio source is transmitted continuously and substantially without intermediate storage and processed in the audio sink.

Figure 2:
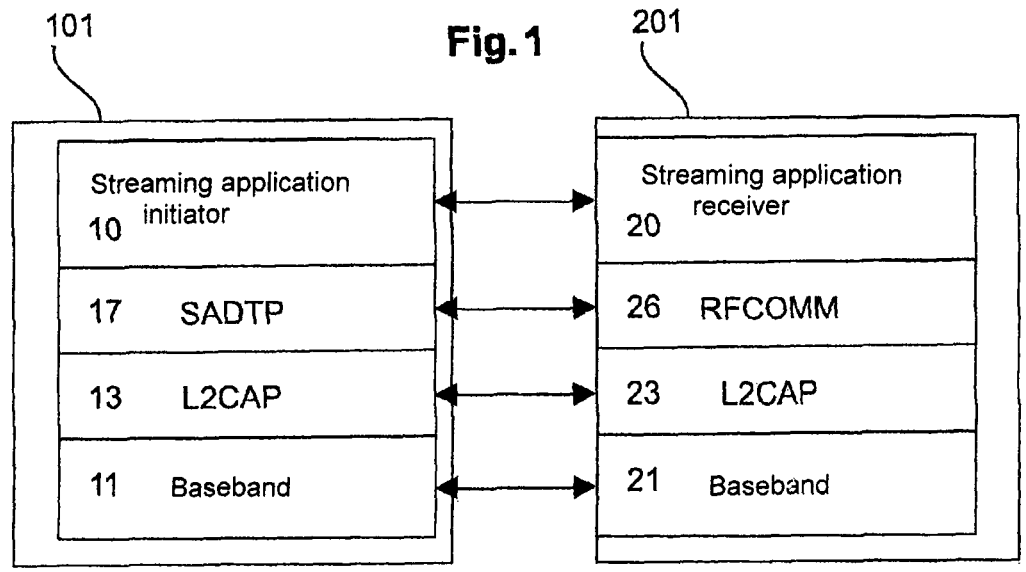
FIG. 2 shows a diagrammatic representation of protocol layers of a Bluetooth protocol according to a first embodiment.

FIG. 2 shows a diagrammatic representation of the protocol layers of a Bluetooth protocol according to a first embodiment. Therefore FIG. 2 shows the protocol layers of the source or stream initiator 100 and the protocol layers of the sink or stream acceptor 200. The initiator has a baseband layer 11, a logical link control and adaptation protocol L2CAP 13 and an audio distribution transport protocol SADTP 17. The initiator 100 further has an application layer. The protocol layers of the initiator 100 differ from the protocol layers of a stream initiator in accordance with the state of the art in that an audio distribution transport protocol 17 is used instead of the audio/video distribution transport protocol AVDTP. That protocol SADTP represents a proprietary protocol which can be implemented by way of the logical link control and adaptation protocol L2CAP.

Figure 1:
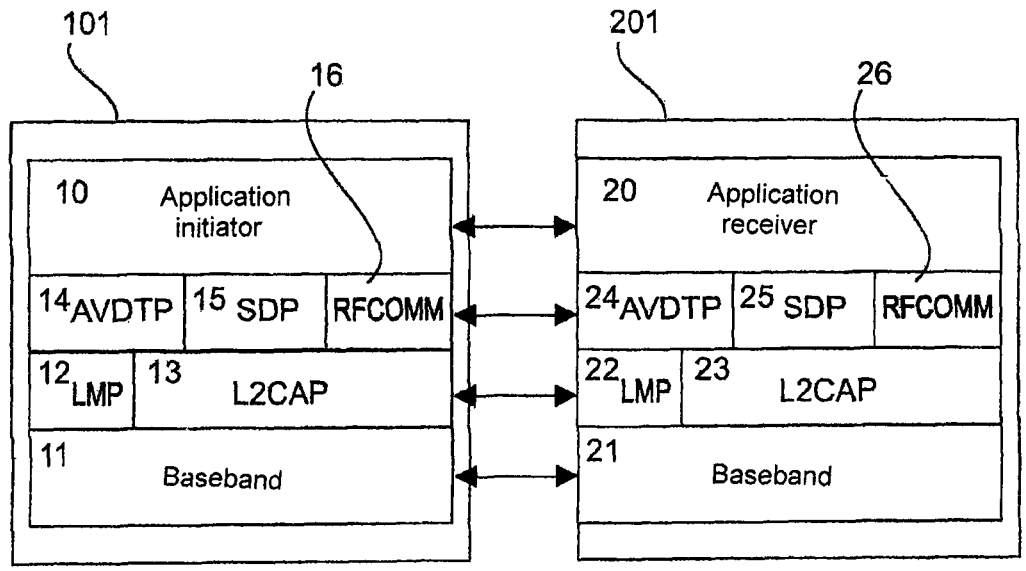
FIG. 1 shows a representation of protocol layers of a Bluetooth standard according to the state of the art.

The streaming acceptor 200 has a baseband 21, an L2CAP layer 23, an RFCOMM 26 and a streaming application and corresponds to the application acceptor 20 of FIG. 1, that is to say the state of the art. It is possible in that way to ensure that all computer devices which have those protocol layers can be used as a Bluetooth audio sink 200 according to the invention.

The proprietary audio distribution transport protocol SADTP 17 differs from the audio/video distribution transport protocol AVDTP in particular in that it can be interpreted on the computer device firstly as a conventional data connection by way of L2CAP. Retransmissions or repeated transmission of L2CAP packets which were not received or were received erroneously are not effected or are effected only to a certain degree. That permits a continuous real-time transmission which involves a dedicated latency. That avoids the latency of the wireless transmission of the audio signals exceeding for example 40 ms. According to the first embodiment of the invention a Bluetooth audio source or initiator 10 has a memory for the data transmitted by way of the L2CAP. The data to be transmitted by the L2CAP are arranged in data packets which can represent for example audio data packets. The audio data packets can then be converted into L2CAP packets. The size of the audio data packets can be used for the audio codecs employed or for adjusting the required data rate.

In the transmission of the audio packets which have been converted to L2CAP packets the audio distribution transport protocol SADTP 17 according to the invention can prevent L2CAP packets which have not been received or which have been erroneously received leading to a breakdown in the audio transmission.

According to the invention optionally audio coding can be effected in the application layer 10 of the streaming initiator 100 and audio decoding can be effected in the application layer of the streaming acceptor 200.

Figure 3:
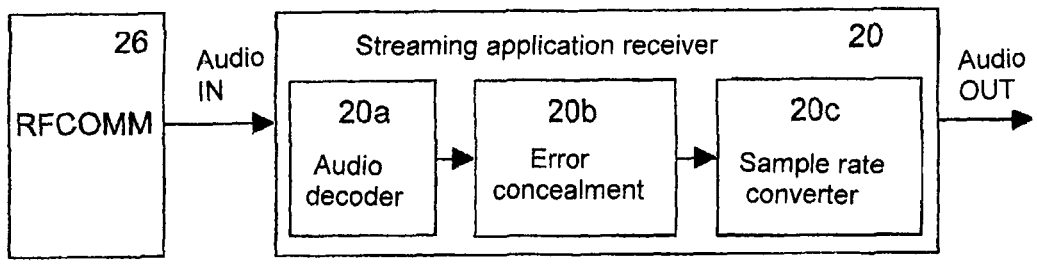
FIG. 3 shows a schematic block circuit diagram of a Bluetooth audio source and a Bluetooth audio sink according to a second embodiment of the invention.

FIG. 3 shows a block circuit diagram of a Bluetooth audio source according to a second embodiment. The source or the application 20 receives data for example by way of the RFCOMM protocol 26. The streaming application 20 has an audio decoder 20a, an error concealment unit 20b and a sample rate converter 20c. Decoding of the received audio data is effected in the audio decoder 20a. The error concealment unit 20b conceals audio data which are erroneous or not received. It is possible in that way to minimize audible skips in the audio transmission. That can be effected for example by replacing an erroneous packet by a preceding packet. Error concealment is advantageous in particular in audio streaming by way of wireless connections.

The sample rate converter 20c serves to compensate for differences in the cycle rate between the audio source (Bluetooth transmitter) and the audio sink (Bluetooth receiver). The difference in the cycle rates between audio source and audio sink can therefore result in the sample cycles in source and sink not being the same or also not being synchronized. The sample rate converter 20c however can provide for output of the audio data at a different sample rate from the sample rate of the audio source. The function of the sample rate converter can be made possible for example by discarding audio signals or by waiting for fresh audio samples. If the received audio data are not output directly by means of the streaming acceptor 20 but are only stored then the sample rate converter 20c is not directly required.

According to the invention an RFCOMM or another suitable protocol can be used for data transmission by way of the L2CAP. As almost all computer devices involved as an audio sink however can process the RFCOMM protocol according to the invention an operationally independent and flexible audio streaming is made possible for example from a wireless microphone to a smartphone, table, notebook and so forth via the Bluetooth standard.

According to the invention there is provided a method for the wireless transmission of audio signals which permits an operating system and manufacturer-independent streaming with a dedicated delay (dedicated latency) and high audio quality by way of the Bluetooth protocol. In that respect audio transmission is effected from a microphone as the audio source to a smart device or PC as an audio sink without additional adaptor.

According to the invention it is possible to modify the protocols on the part of the audio source in such a way that the computer device receiving the stream can receive high-grade audio signals with dedicated latency even without support of standard-defined audio streaming protocols and can possibly output them again in real time.

According to the invention the Bluetooth audio sink can output the received audio data with no latency at an analog output. According to the invention the Bluetooth audio source can pass the audio data wirelessly to a plurality of computer devices as audio sinks.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for wirelessly transmitting at least one continuous audio stream based on Bluetooth protocol from a streaming initiator to a streaming acceptor, comprising the steps:
   converting the at least one continuous audio stream into audio data packets in an application layer of the streaming initiator;
   converting the audio data packets into L2CAP data packets in accordance with a protocol having access to an L2CAP layer; and
   wirelessly transmitting the L2CAP data packets by the streaming initiator and to the streaming acceptor;
   wherein:
      the initiator suppresses a renewed transmission of L2CAP data packets which that are erroneous or not confirmed by the streaming acceptor; or
      the initiator reduces renewed transmission of L2CAP data packets that are erroneous or not confirmed by the streaming acceptor to a predetermined degree limited by a maximum permissible latency.

2. The method as set forth in claim 1;
   wherein coding of the L2CAP data packets is effected in the application layer of the streaming initiator and decoding of the transmitted L2CAP data packets is effected in the application layer of the streaming acceptor.

3. The method as set forth in claim 1, further comprising the steps:
   performing audio decoding of the received L2CAP data packets in an application layer of the streaming acceptor to obtain a decoded audio signal;
   performing error concealment in the received L2CAP data packets in the application layer of the streaming acceptor; and
   real-time reproduction of the decoded audio signal with dedicated latency.

4. A wireless microphone unit comprising:
   a wireless transmitter configured to wirelessly transmit at least one continuous audio stream as a streaming initiator based on the Bluetooth protocol;
   wherein the wireless transmitter is configured to:
      convert the continuous audio stream into audio data packets;
      convert the audio data packets into L2CAP data packets in accordance with a protocol having access to an L2CAP layer; and
      wirelessly transmit the L2CAP data packets by way of the L2CAP layer, to a Bluetooth streaming acceptor; and
   wherein the wireless transmitter is further configured to:
      suppresses renewed transmission of L2CAP data packets that were erroneously transmitted or not confirmed by the Bluetooth streaming acceptor; or
      reduce renewed transmission of L2CAP data packets that were erroneously transmitted or not confirmed by the Bluetooth streaming acceptor to a predetermined degree limited by the maximum permissible latency.

5. The method as set forth in claim 1;
   wherein the audio data packets are converted into the L2CAP data packets in accordance with an RFCOMM protocol in the initiator.

6. The method as set forth in claim 1, further comprising the steps:
- performing audio decoding of the received L2CAP data packets in an application layer of the streaming acceptor to obtain a decoded audio signal;
- adapting a sample rate of the L2CAP data packets if the sample rate in the streaming initiator differs from the sample rate in the streaming acceptor; and
- real-time reproduction of the decoded audio signal with dedicated latency.

7. The method as set forth in claim 3, further comprising:
- adapting a sample rate of the L2CAP data packets if the sample rate in the streaming initiator differs from the sample rate in the streaming acceptor.

8. The wireless microphone unit as set forth in claim 4; wherein the audio data packets are converted into L2CAP data packets in accordance with an RFCOMM protocol in the initiator.

\* \* \* \* \*

UNITED STATES PATENT AND TRADEMARK OFFICE
CERTIFICATE OF CORRECTION

PATENT NO. : 10,104,147 B2
APPLICATION NO. : 15/523434
DATED : October 16, 2018
INVENTOR(S) : Axel Schmidt et al.

Page 1 of 1

It is certified that error appears in the above-identified patent and that said Letters Patent is hereby corrected as shown below:

On the Title Page

Under (72) Inventor:
Please correct the address of the Inventor Konstantin Septinus to read:
– Lisztstraße 12b
22763 Hamburg, DE –

Under (87) PCT Pub. No.:
Please correct the PCT Publication No. to read – WO2016/087425 – instead of "WO2016/087245"

Signed and Sealed this
Sixteenth Day of July, 2019

Andrei Iancu
*Director of the United States Patent and Trademark Office*